United States Patent [19]
Lovegreen et al.

[11] Patent Number: 5,814,968
[45] Date of Patent: Sep. 29, 1998

[54] BATTERY CHARGER AND RECHARGEABLE ELECTRONIC PAGING DEVICE ASSEMBLY

[75] Inventors: Kenneth J. Lovegreen, Lewisville; Russell P. Blink, Richardson; James A. Henderson, Duncanville, all of Tex.

[73] Assignee: Long Range Systems, Inc., Dallas, Tex.

[21] Appl. No.: 494,921

[22] Filed: Jun. 26, 1995

[51] Int. Cl.⁶ .................................................. H01M 10/46
[52] U.S. Cl. ...................................................... 320/2; 320/6
[58] Field of Search .................................. 320/216, 5, 15; 429/99, 100, 149, 154, 157, 158; D13/108, 107

[56] References Cited

U.S. PATENT DOCUMENTS

| | | | |
|---|---|---|---|
| D. 371,054 | 6/1996 | Henderson | D7/624 |
| 3,696,283 | 10/1972 | Ackley, III | 320/2 |
| 4,009,429 | 2/1977 | Mullersman | 320/2 |
| 4,319,178 | 3/1982 | Sugalski | 320/2 |
| 4,737,420 | 4/1988 | Ikeda et al. | 429/1 |
| 5,107,197 | 4/1992 | Arlinghaus | 320/15 |
| 5,191,275 | 3/1993 | Singhal | 320/2 |
| 5,212,021 | 5/1993 | Smith et al. | 429/9 |
| 5,346,786 | 9/1994 | Hodgetts | 429/159 |
| 5,357,185 | 10/1994 | Chen | 320/2 |
| 5,366,827 | 11/1994 | Belanger et al. | 429/99 |
| 5,403,679 | 4/1995 | Stone | 429/99 |

*Primary Examiner*—Edward Tso
*Attorney, Agent, or Firm*—Smith & Catlett, P.C.

[57] ABSTRACT

A battery charger and electronic device assembly is provided for recharging stackable electronic devices in multiple orientation or rotation with respect to each other without the need for either removing batteries or plugging devices into charging racks. In one embodiment of the present invention, a battery charger and rechargeable electronic device assembly includes multiple rechargeable electronic devices with opposing stackable surfaces having a plurality of electrical terminals extending therethrough to place each electronic device in electrical communication with each other device and the battery charger base unit without regard to the orientation the terminals or rotation of the device.

14 Claims, 2 Drawing Sheets

BATTERY CHARGER AND RECHARGEABLE ELECTRONIC PAGING DEVICE ASSEMBLY

CROSS-REFERENCE TO RELATED APPLICATIONS

This Application relates to application Ser. No. 31,991, filed on Dec. 12, 1994, entitled "Combined Drink Coaster and Pager", issued to James A. Henderson as Patent No. Des. 371,054 on Jun. 25, 1996 and assigned to Long Range Systems, Inc.

BACKGROUND OF THE INVENTION

1. Technical Field of the Invention

This invention relates to battery chargers, and more particularly, to a battery charger and stackable rechargeable electronic device assembly.

2. Description of Related Art

Battery chargers utilizing rechargeable battery modules and supporting racks are well known. Modules and racks on such chargers facilitate multiple simultaneous recharging of batteries of various sizes by plugging the battery into the module or rack connected to the battery charger assembly. Such battery chargers, modules and racks have been disclosed, for example, in U.S. Pat. Nos. 3,696,283; 4,009,429; 4,319,178; 5,346,786; 5,357,185; 5,366,827; and 5,403,679. These traditional battery charger systems require the user to remove the depleted battery from the battery operated device and plug it into the battery charger module or rack included with the battery charger.

In recent years, the number of industrial, commercial and private users of multiple rechargeable electronic devices has substantially increased. These users include service industries which provide waiting customers with pagers for use during lengthy waits for appointments, as well as businesses which require employees to carry pagers, walkie talkies or cellular telephones. As the provider of the electronic device, the business owner is routinely and frequently required to recharge the batteries used to operate multiple units. Traditional battery charger systems are cumbersome and inefficient, however, as standard charger bases, racks and modules require the user to carefully position the battery or plug the electronic device into the charger housing. In addition, simultaneous charging of multiple electronic devices requires the user to designate valuable use and storage space for the charger assembly racks and modules.

For example, in the food services industry, restaurant owners are using both illumination coasters and paging coasters to improve the restaurant's atmosphere and the comfort of their customers. Paging coasters are given to patrons as they arrive for service to use as beverage coasters at the bar or other nearby reception areas while waiting to be seated at a table. Once the customer's table is ready, the server pages the customer by sending a signal to the coaster which causes internal lights to flash. Restaurant owners may also use illumination coasters for beverages or centerpieces at individual tables to provide atmospheric lighting.

Understandably, the restaurant owner needs to have a sufficient number of paging or illumination coasters on hand to meet the numbers and demands of the establishment's customers. These demands require the service provider to either continually refresh the charge on the coaster device to prevent failure or to purchase a sufficient number of individual coasters to meet the maximum demand anticipated. Use of standard battery charger and rack assemblies during customer service hours, however, requires the provider to routinely shift their attention from the waiting customer to the charger assembly, to facilitate proper placement and orientation of the rechargeable coaster device in the charger module or rack.

Although there are no known prior art teachings of a solution to the aforementioned deficiencies and shortcomings of prior art battery chargers, several prior art references exist that discuss subject matter related to the subject matter of the present application. Exemplary of such prior art references are U.S. Pat. Nos. 5,346,786 and 3,696,283. Each of these references is discussed briefly below.

U.S. Pat. No. 3,696,283 to Ackley, relates to a battery charger assembly having a power supply module and a series of detachable charging modules for accommodating chargeable cells of various physical and electrical sizes. Ackley '283 teaches a plurality of self-contained modules adaptable to receive a fixed number of cells for recharging. Ackley '283, however, does not teach or suggest a battery charger assembly wherein a power supply module is utilized in combination with a plurality of electronic devices for stackable recharging without the need for a separate charging module for each electronic device.

U.S. Pat. No. 5,346,786 to Hodgetts, relates to a modular battery rack system and discloses the use of stacked cells with individualized connections for monitoring, charging, discharging, and electrical illumination of any weak or damaged cells. Hodgetts '786 is limited, however, to charging and monitoring battery cells within a battery rack system. Hodgetts '786 fails to teach or suggest a battery charger system not requiring a module or rack for supporting and charging the individual cells in any rotation or orientation.

Therefore, it would be a distinct advantage within the battery charger industry to have an improved multi-unit recharging system which enables a user of multiple electronic devices to easily recharge the devices as needed, in any orientation or rotation, without the cumbersome use of racks and modular recharging assemblies. The battery charger and electronic device assembly of the present invention provides such a solution.

SUMMARY OF THE INVENTION

The present invention is a battery charger and electronic device assembly for recharging stackable electronic devices in multiple orientation or rotation with respect to each other without the need for either removing batteries or plugging devices into charging racks. In one embodiment of the present invention, a battery charger and rechargeable electronic device assembly is provided having a battery charger base unit with an electrical terminal for applying an alternating current source to the rechargeable electronic device.

In one aspect of the invention, the base unit has a plurality of electrical terminals for electrical connection with a rechargeable electronic device. In another aspect of the invention, the base unit has four electrical terminals. In another aspect of the invention, the electrical terminals of the base unit include two terminals connected to an alternating current source or line voltage and two terminals connected to neutral.

In another embodiment of the invention, the electronic device has two opposing surfaces with an electrical terminal extending through the surfaces for electrical connection between a base unit charger and another electronic device. In another aspect of the invention, the electronic device has two opposing surfaces with a plurality of electrical terminals extending therebetween for electrical connection with a base unit charger and another electronic device.

In still another aspect of the invention, the electronic device has two opposing surfaces with a plurality of electrical terminals extending between the surfaces for electrical connection between two other rechargeable electronic devices. In one aspect of the invention, the electronic devices have a top and a bottom surface wherein the bottom surface of one electronic device will rest upon the top surface of another electronic device during charging.

In still another aspect of the invention, the electrical terminals of the battery charger base unit and the electronic device have two ends, where the first end of the terminals on a base unit or electronic device engage the second end of the terminals on another electronic device. In another embodiment of the invention, a plurality of electronic devices are electrically connected to each other and a base unit through electrical terminals when the devices are stacked upon each other with a base unit at the bottom of the stack. In another aspect of the invention, gravity holds the stack of electronic devices in position on top of a battery charger base unit.

In another aspect of the invention, the electrical terminals of the electronic device include a plurality of electrical terminals for receiving a positive voltage from an alternating current source and a plurality of electrical terminals for receiving a negative voltage from an alternating current source. In yet another embodiment of the invention, the alternating current source is provided to the electronic device through electrical connection with the battery charger base unit.

In still another aspect of the invention, the electronic device has four electrical terminals wherein two terminals are for receiving a positive voltage from the battery charger base unit and two terminals are for receiving a negative voltage from the battery charger base unit. In another aspect of the invention, the two positive voltage terminals are electrically connected to each other and the two negative terminals are electrically connected to each other. In still another aspect of the invention, the two positive voltage terminals are connected in series to the positive terminal of an electronic device's internal voltage supply and the two negative voltage terminals are connected in series with a half-wave rectifier circuit, wherein the half-wave rectifier circuit is connected in series with the positive terminal of the voltage supply within the electronic device. In still another aspect of the invention, the internal voltage supply is a rechargeable battery. In still another aspect of the invention, the internal voltage supply is a plurality of rechargeable batteries.

In another embodiment of the invention, a plurality of electronic devices having a four electrical terminal configuration are placed in electrical connection with a battery charger base unit and another electronic device through stacking of the opposing surfaces of each electronic device in any direction, orientation or rotation.

In another aspect of the present invention, a battery charger base unit is provided with a voltage input and a voltage output, having said voltage input electrically connected to an alternating current voltage source. In still another aspect of the present invention, a battery charger base unit with an electronic device stacked thereon for charging is provided in electrical engagement with another battery charger base unit having a rechargeable electronic device stacked thereon for charging. In still another aspect of the present invention, a first base unit is in electrical engagement with a second base unit through a jumper cable tied between the voltage output of said first base unit and the voltage input of said second voltage unit.

In yet another aspect of the present invention, a plurality of battery charger base units are connected in cascading series fashion with a jumper cable electrically connecting the voltage output of a first base unit to the voltage input of an adjacent base unit. In yet another aspect of the present invention, each cascading battery charger base unit has a plurality of rechargeable electronic devices stacked upon said charger base unit, in electrical communication with said charger base unit and each other through a series of electrical terminals.

In still another embodiment of the present invention, said electronic devices include internal charging circuitry which uses an alternating current to charge the voltage source or battery of the device and a half-wave rectification circuit to deliver unidirectional positive current to the internal battery or voltage source of the electronic device.

In still another aspect of the present invention an electronic device is provided having a stackable shape consisting of at least two opposing sides with a plurality of electrical terminals extending therethrough. In still another aspect of the present invention, the two opposable stackable surfaces are substantially planer. In yet another aspect of the present invention, the electronic devices are stackable paging coasters with electrical terminals extending through opposing surfaces. In another aspect of the invention, the electronic devices are stackable illumination coasters with electrical terminals extending through opposing surfaces. In another aspect of the invention, the electronic devices are stackable portable CD-ROM players with electrical terminals extending through opposing surfaces. In another aspect of the invention, the electronic devices are stackable cassette players with electrical terminals extending through opposing surfaces. In another aspect of the invention, the electronic devices are stackable walkie talkies with electrical terminals extending through opposing surfaces. In another aspect of the invention, the electronic devices are cellular telephones with electrical terminals extending through opposing surfaces. In another aspect of the invention, the electronic devices are pagers with electrical terminals extending through opposing surfaces.

BRIEF DESCRIPTION OF THE DRAWINGS

The invention will be better understood and its further objects and advantages will become more apparent to those skilled in the art by reference to the following drawings, in conjunction with the accompanying specification, in which.

Like reference numerals are used to indicate like parts in all figures of the drawings.

DETAILED DESCRIPTION OF EMBODIMENTS

The battery charger and electronic device assembly of the invention utilizes a plurality of rechargeable electronic devices that can be electrically connected for recharging to a battery charger base unit either individually or simultaneously by stacking the electronic devices on each other to establish electrical connection through each device to the battery charger base unit. The electronic devices can be any rechargeable electronic device adaptable to include the internal circuitry, stackable surface and terminal configuration of the present invention. These electronic devices include, but are not limited to, paging or message devices, paging coasters, illumination coasters, walkie talkies, cellular telephones, CD-ROM players, cassette tape players, and other rechargeable electronic devices.

Figure 1:
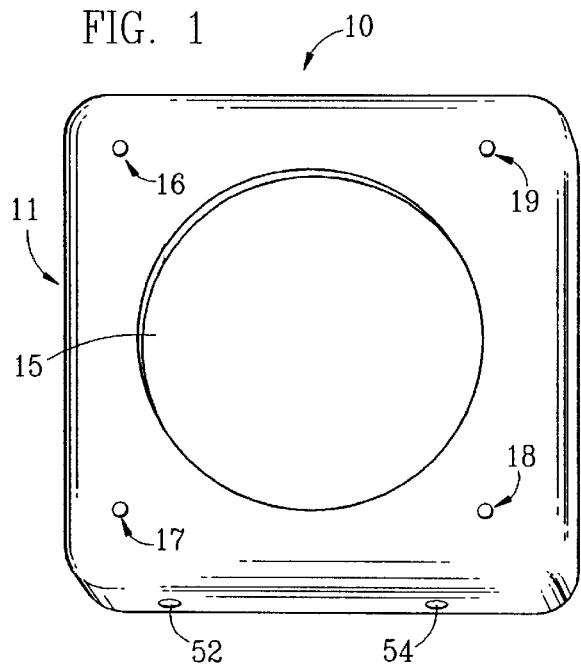
FIG. 1 is a top perspective view of a preferred embodiment of the invention depicting a battery charger base unit for a stackable rechargeable electronic device.
Figure 2:
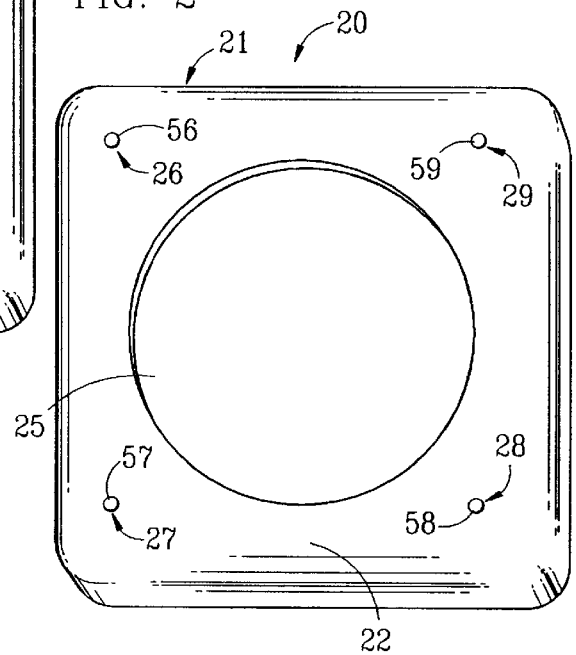
FIG. 2 is a top perspective view of a preferred embodiment of the invention depicting a stackable rechargeable electronic device.
Figure 3:
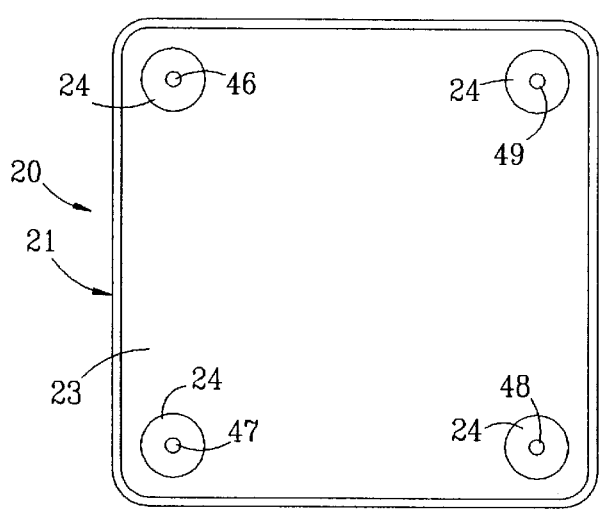
FIG. 3 is a bottom plan view of a preferred embodiment of the invention depicting a stackable rechargeable electronic device.
Figure 4:
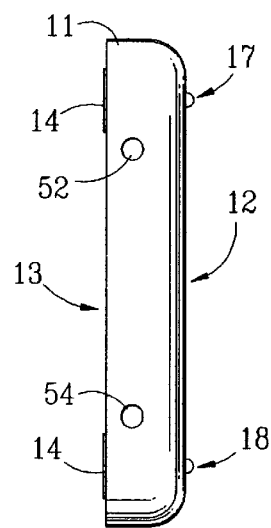
FIG. 4 is a side perspective view of a preferred embodiment of the invention depicting a battery charger base unit for a stackable rechargeable electronic device.
Figure 5:
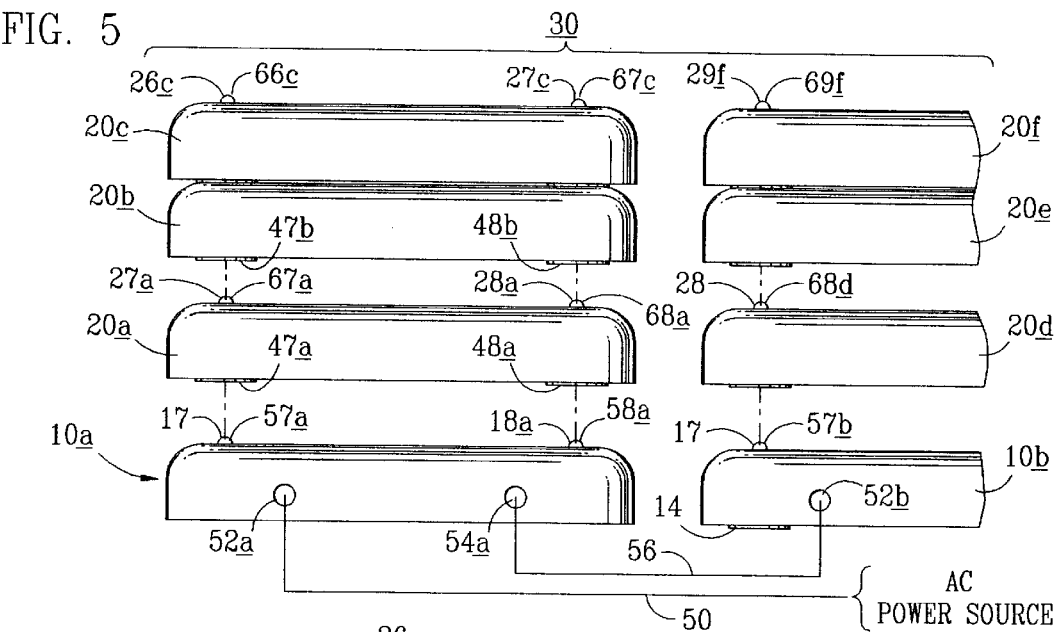
FIG. 5 is a side elevation view of a plurality of stackable electronic coaster units on top of a battery charger base unit in cascading connection with a second plurality of stackable electronic coaster units and battery charger base unit.

Referring to FIGS. 1 and 4, a battery charger base unit 10 is provided which is adapted to include an outer casing 11 having a top surface 12 with four electrical terminals 16, 17, 18, 19, a bottom surface 13 with optional raised feet 14, a voltage in port 52 and a voltage out port 54. Referring to FIGS. 2 and 3, electronic device 20 comprises an outer casing 21, opposing surfaces 22 and 23, raised feet 24, and electrical terminals 26, 27, 28, 29 having concave bases 46, 47, 48 and 49. Each electrical terminal includes a convex tip for establishing an electrical contacting surface with another electrical terminal. As shown in FIG. 5, electrical terminals 17, 18, 26, 27, 28, and 29 have convex tips 57, 58, 66, 67, 68, and 69 respectively.

In a preferred embodiment of the invention, each electrical terminal passes through an aperture 36 in a circuit board 35 positioned within electronic device 20 between opposing surfaces 22, 23. In this embodiment, each terminal has a curved spring washer 33 positioned between the circuit board 35 and the terminal's shoulder 31. Curved washer 33 maintains the electrical contact between the terminals and circuit board 35 when movement occurs within the device due to the impact of stacking or other pressure between the terminals and outer covering 21 of device 20.

It will be understood and appreciated by those skilled in the art that the electrical terminals and curved spring washers should be constructed of a suitable highly conductive material such as brass, plated with a conductive material such as nickel or gold to prevent corrosion. In a preferred embodiment of the invention, gold plating on the washers and terminals is preferred. In addition, aperture 36 may also be coated with a suitable conductive material to improve the performance of the invention. Referring back to FIGS. 1 through 4, it is contemplated that base unit 10 and electronic device 20 can have other types and shapes of outer casing 11 and surfaces 12, 13 as long as the shape, strength and durability of base unit 10 permits and supports the stacking of a plurality of electronic devices on its top surface 12 and the corresponding electrical terminals 16, 17, 18, 19. Furthermore, it will be understood and appreciated by those skilled in the art that the outer casing 22 of electronic device 20 is not limited to the shape or configuration shown in the drawings. The opposing surfaces 22, 23 of device 20 can be any shape with a flat or moderately curved section to facilitate stacking of multiple devices placed in electrical communication with each other. By way of example only, the figures of the drawings show base unit 10 and electronic device 20 as square stackable illumination beverage coasters having substantially flat surfaces 12, 13, 22, 23 and beverage holder indentations 15 and 25 optionally molded into outer surfaces 11 and 21 respectively. This shape facilitates the placement of the electrical contacting terminals of each unit or device in the four respective corners. Similarly the tips 56, 57, 58, 59 and bases 46, 47, 48, 49 can be any shape which enables slidable contact for electrical communication between adjacently stacked terminals.

Referring to FIG. 5, battery charger and electronic device assembly 30 is shown with a plurality of electronic devices 20a, 20b, 20c, 20d, 20e, and 20f in stacked relationship to each other and base units 10a and 10b. Voltage in port 52a of base unit 10a is shown electrically connected to an AC power supply source 50. In cascading fashion, voltage out port 54 of base unit 10a is shown electrically connected to port 52b of base unit 10b using jumper cable 56. In like fashion, a series of base units 10 can be electrically connected in cascading fashion by use of jumper cables 56 between voltage out ports 54 and voltage in ports 52 of adjacent base units 10.

Figure 6:
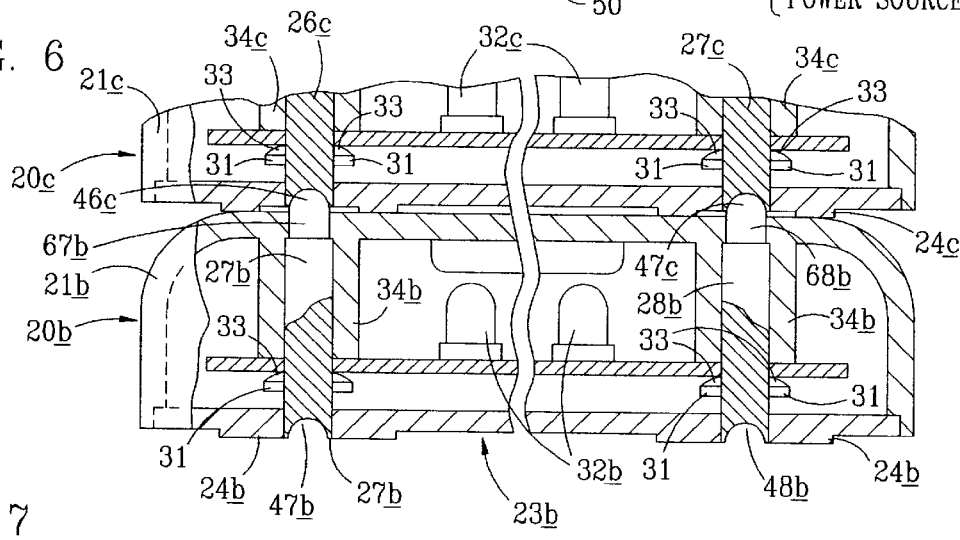
FIG. 6 is a side elevation of two stackable rechargeable electronic devices partially in section.

Referring to FIGS. 5 and 6, the physical electrical connection between base units 10 and plurality of electronic devices 20 will now be discussed. As disclosed earlier, each electrical terminal comprises a concave base and a convex tip. When the devices 20 are stacked upon each other and a base unit, in any configuration, rotation, or orientation, the convex tip of the lower device establishes physical contact with the concave tip of the upper device. Specifically, convex tips 67b, 68b of terminals 27b, 28b on device 20b are shown in physical contact with concave base 46c, 47c of terminals 26c, 27c, on device 20c. Devices 20a and 20d are shown in position between base units 10a, 10b and electronic devices 20b, 20e respectively. In this orientation, terminals 17, 18 of base unit 10a will have tips 57a, 58a in electrical connection with concave bases 47a, 48a of terminals 27a, 28a of unit 20a, with the respective tips 67a, 68a in connection with bases 47b, 48b of terminals 27b, 28b of adjacent device 20b. In like fashion, the terminals of devices 20d, 20e, and 20f are in physical contact with the terminals of the adjacent devices and unit 10b.

The example configuration shown in the figures of the drawings place each base unit 10 in electrical communication with a plurality of stacked electronic devices 20 through the plurality of terminals in each device. This electrical communication facilitates transmitting any type of electrical communication signal to each device through terminals, such as alternating current or direct current to recharge the device, and data communication signals to reprogram the electronic device.

Figure 7:
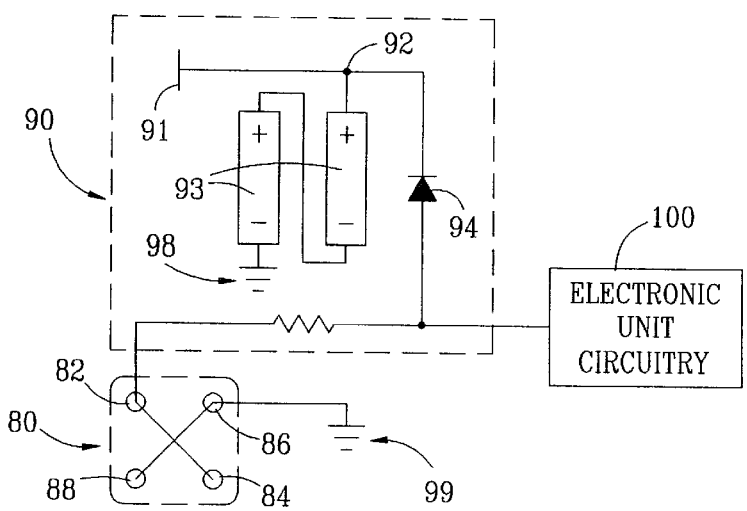
FIG. 7 is an electrical diagram, in schematic form, of a charging circuit for a stackable rechargeable electronic device.

The charging of the electronic devices 20 through base units 10 will be best understood with reference to the circuit shown in FIG. 7. In FIG. 7, a rechargeable electronic device circuit is shown incorporating a preferred embodiment of the invention. The circuit disclosed in FIG. 7 consists of rechargeable power supply circuit 90, charging terminal configuration 80, and electronic unit circuitry 100. Charging circuit 90 includes a half-wave rectification circuit shown herein as diode 94 and resister 96. It will be understood and appreciated by one skilled in the art that charging circuit 90 may include an alternative half-wave rectification circuit or a full-wave rectification circuit. It should be noted that the particular layout of the electronic unit circuitry 100 in conjunction with the layout of circuitry 90 of the invention will be determined by one of ordinary skill in the art according to the particular parameters of the electronic device. It is further contemplated that other physical and electrical arrangements of the charging circuit 90 within the electronic device may alteratively be used with the rotatable terminal configuration 80 to practice the present invention.

The power supply circuit 90 supplies electronic unit circuitry 100 with the current necessary to operate electronic device 20. As shown in the drawing, power supply circuit 90 comprises rechargeable battery cell 93, resistor 96 and a diode 94. In a preferred embodiment of the invention, diode 94 is connected in series to high voltage 91 (Vcc) and resistor 96, and in parallel with current source 93, shown here as two batteries tied in series to low voltage source 98 or ground.

The electrical terminal configuration 80 of device 20 preferably comprises four terminals 82, 84, 86, 88 connected to the rechargeable battery cell 93 as shown. Specifically, terminals 82, 84 are connected to the positive terminal of battery cell 93 at node 92 in series with resistor 96 and diode 94. Terminals 86, 88 provide the charger base unit 10 with a return current path to ground 99.

In this embodiment, when an alternating current is supplied to at least two adjacent terminals (non-diagonal) of configuration 80, a positive charging voltage will be sent to node 92 through positive terminals 82, 84. Alternating current passing through terminals 86, 88, provides the return current path for the positive half-cycles (unidirectional current) to the battery cell at node 92 to properly recharge the electronic device 20. Referring to FIGS. 2 and 7 for purposes of illustration, diagonally tied terminal pair 82, 84 correspond with device 20 terminals 26, 28, whereas diagonally tied terminal pair 86, 88 correspond with device 20 terminals 27, 29.

A discussion of the operation of the battery charger and electronic device assembly 30, as shown in FIGS. 1–7 will now be described. Base unit 10 is connected to a voltage source 50 at voltage in port 52. The voltage source supplies alternating current to diagonally tied electrical terminals 16, 18. A plurality of electronic devices 20 are stacked in any rotation or orientation on top of base unit 10 so that each device 20 is in electrical communication with each other device 20 and base unit 10 via the electrical contacts established between interlocking concave ends 46, 47, 48, 49 and convex ends 66, 67, 68, 69 of terminals 26, 27, 28, 29. As the current from the base unit 10 travels through the electronic devices 20, each adjacent device 20 receives a charging current from the contacting terminals 26, 27, 28, 29 of the lower device 20. The pin configuration 80, coupled with the internal rectifier circuitry 90, carry current from base unit 10 to each internal battery cell 93 for simultaneous recharging of multiple devices 20a, 20b, 20c, 20d, 20e, and 20f.

Regardless of the orientation or rotation of terminals 26, 27, 28, 29 of each adjacent electronic device 20, the base unit 10 will provide a charging current through its four electrical terminals to the four diagonally tied terminals of the electronic devices. Since terminals 26, 28 and 27, 29 are tied in positive and negative pairs to internal circuitry 90 there will be at least three points of contact on the lower adjacent device (two positive contacts and one negative or two negative and one positive) to provide the appropriate charge to the internal batteries of the devices. Furthermore, a charging light (not shown) may be placed inside each device to indicate that proper charging is taking place.

The battery charger electronic device assembly of the present invention eliminates the need for traditional charging racks or modules, as well as the need for taking time to place the device or battery in a charging unit in a proper, single orientation. The stackable chargers and devices of the invention have one simple charging base unit and each device has the circuitry required to charge its internal batteries.

The present invention provides a distinct advantage over prior art systems by reducing the amount of time and effort needed to position an electronic device on a battery charging assembly rack or module and reduces the size and materials used to make a standard battery charger and module assembly.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The advantages of using remote control paging technology in retail and service industries to notify and contact waiting customers are well known. Instead of requiring customers to wait nearby a receptionist's station, waiting room or crowded foyer for a doctor to become available to the next patient or a table to empty for the next restaurant customer, businesses are providing their waiting customer with a paging device used to signal the customer, either audibly or visually, that a table is available or the patient's room is ready. Although these paging devices provide customers with much convenience and flexibility with time instead of being tied to a small waiting area, the disadvantages to the service provider of the prior art devices include the need to routinely change, refresh or recharge the batteries of the paging device. The present invention provides a more efficient and less burdensome means for routinely recharging the electronic devices.

What is claimed is:

1. A battery charger and rechargeable electronic device assembly, comprising:

a battery charger base unit having a voltage input port, a voltage output port and an upper supporting surface with a plurality of electrical charging terminals extending perpendicularly above said supporting surface;

a plurality of stackable rechargeable electronic devices, each said device having a perimeter, opposing top and bottom surfaces, and an internal rechargeable power source;

a plurality of electrical terminals in electrical communication with said internal rechargeable power source and disposed transversely through said top and bottom surfaces, each electrical terminal having a first end extending through the top surface of the electronic device and a second end extending through the bottom surface of the electronic device; wherein said first end of the terminal slidably connects with the second end of any one terminal on an adjacently stacked electronic device to establish an electrical connection between the base unit and the adjacently stacked electronic device for simultaneously recharging the internal power source of each electronic device without regard to the respective orientation of the perimeters of each device.

2. The battery charger and electronic device assembly of claim 1, wherein the first end of the terminal is a concave surface and the second end of the terminal is a convex surface which slidably connects with the concave surface.

3. The battery charger and electronic device assembly of claim 1, wherein said base unit further comprises two positive electrical charging terminals and two neutral terminals.

4. The battery charger and electronic device assembly of claim 1, wherein said internal rechargeable power source of said electronic device further comprises a high voltage terminal and a low voltage terminal for supplying operating current to said unit circuitry, and internal rectifier circuitry.

5. The battery charger and electronic device assembly of claim 4, wherein said electronic device includes at least one terminal connected to the rechargeable power source and at least one terminal connected to a ground.

6. The battery charger and electronic device assembly of claim 4, wherein said electronic device includes two positive terminals tied in series to the internal rechargeable power source and two negative terminals tied in series to the ground.

7. The battery charger and electronic device assembly of claim 6, wherein said perimeter of said electronic device has four corners and each said terminal is proximal to a corner of said perimeter.

8. The battery charger and electronic device assembly of claim 6, wherein the terminals are adjacent to the perimeter of the electronic device such that each positive terminal is adjacent to each negative terminal, and diagonally across from the other positive terminal and each negative terminal is adjacent to each positive terminal and diagonally across from the other negative terminal.

9. The battery charger and electronic device assembly of claim 1, wherein the opposing first surface of a first electronic device rests on the supporting surface of the base unit, and the second surface of the first electronic device supports the first surface of a second electronic device, such that the electrical terminals of the first electronic device are in slidable physical contact with the charging terminals of the base unit and the electrical terminals of the second electronic device.

10. The battery charger and electronic device assembly of claim 9, wherein the second surface of the second electronic device supports the first surface of a third electronic device and the electrical terminals of the second electronic device are in slidable physical contact with the electrical terminals of the third electronic device.

11. The battery charger and electronic device assembly of claim 1, wherein the stackable electronic devices are rechargeable paging coasters.

12. The battery charger and electronic device assembly of claim 1, wherein the stackable electronic devices are rechargeable walkie talkies.

13. The battery charger and electronic device assembly of claim 1, wherein the stackable electronic devices are rechargeable electronic pagers.

14. The battery charger and electronic device assembly of claim 1, wherein the stackable electronic devices are rechargeable cellular telephones.

* * * * *